United States Patent [19]
Tsai

[11] Patent Number: 6,104,151
[45] Date of Patent: Aug. 15, 2000

[54] STARTING CIRCUIT AND METHOD FOR STAGEDLY STARTING AN ELECTROSENSITIVE CIRCUIT

[75] Inventor: Ming-Shi Tsai, Taoyuan Shien, Taiwan

[73] Assignee: Delta Electronics Inc., Taoyuan Shien, Taiwan

[21] Appl. No.: 09/248,698

[22] Filed: Feb. 11, 1999

[30] Foreign Application Priority Data

Oct. 2, 1998 [TW] Taiwan ................................. 87116464

[51] Int. Cl.[7] ................................. H02P 6/00; H02P 6/20
[52] U.S. Cl. ............................................. 318/254; 318/439
[58] Field of Search ...................................... 318/254, 439

[56] References Cited

U.S. PATENT DOCUMENTS 3,883,785  5/1975  Fulcher et al. .......................... 318/314
5,327,053  7/1994  Mann et al. .............................. 318/254

*Primary Examiner*—Bentsu Ro
*Assistant Examiner*—Marlon Fletcher
*Attorney, Agent, or Firm*—Alston & Bird LLP

[57] ABSTRACT

A starting circuit and a method for stagedly starting an electrosensitive circuit without introducing a surging current are disclosed. The method includes (a) providing a feedback signal by the electrosensitive circuit, (b) comparing the feedback signal with a reference signal to generate a control signal, and (c) stagedly increasing a current inputted into the electrosensitive circuit according to a voltage of the control signal so that the electrosensitive circuit is stagedly started without introducing the surging current. The starting circuit includes a comparing circuit for receiving a feedback signal from the electrosensitive circuit and comparing the feedback signal with a reference signal to generate a control signal, and a controlling circuit for controlling the electrosensitive circuit to be stagedly started according to the control signal without introducing the surging current.

17 Claims, 4 Drawing Sheets

STARTING CIRCUIT AND METHOD FOR STAGEDLY STARTING AN ELECTROSENSITIVE CIRCUIT

FIELD OF THE INVENTION

The present invention relates to a staring circuit and a method for starting an electrosensitive circuit without introducing a surging current, and especially to a starting circuit and a method for starting a direct-current (DC) motor without introducing a surging current.

BACKGROUND OF THE INVENTION

When a DC motor is initially started, a surging current will be always introduced inside the DC motor. Because the DC motor is suddenly started from the stationary state, the surging current will cause the DC motor a big mechanical shock. This mechanical shock is the main reason of the damages of the DC motor.

The conventional methods for eliminating the surging circuit of the DC motor nowadays are complicated and expensive. One of these methods is to use a protecting circuit to protect the DC motor after the surging current is introduced, but the protecting circuit will also be damaged after using for a long time. Another method is to use a circuit to start the DC motor in the way of a pulse-width modulation (PWM). However, this PWM circuit will introduce an electroacoustic sound while the DC motor is started.

Therefore, an object of the present invention is to improved the defects of the prior art.

SUMMARY OF THE INVENTION

An object of the present invention is to provide a starting circuit for starting an electrosensitive circuit without introducing a surging current.

The starting circuit includes a comparing circuit and a controlling circuit. The comparing circuit is electrically connected with the electrosensitive circuit for receiving a feedback signal from the electrosensitive circuit and comparing the feedback signal with a reference signal to generate a control signal. The controlling circuit is electrically connected with the comparing circuit and the electrosensitive circuit for controlling the electrosensitive circuit to be stagedly started without introducing the surging current according to the control signal.

Preferably, the electrosensitive circuit is a direct-current (DC) motor. The feedback signal is a periodic signal outputted from the DC motor, and the periodic signal is a square-wave signal having a frequency proportional to a rotating speed of the DC motor. When the DC motor is initially started, its rotating speed is low. However, the rotating speed will be increased to a high speed after the DC motor is started for a while.

According to the present invention, the comparing circuit includes a frequency-to-voltage converting circuit and a trigger circuit. The frequency-to-voltage converting circuit is electrically connected with the electrosensitive circuit for transforming the feedback signal to a voltage signal, and the voltage of the voltage signal is associated with the frequency of the feedback signal. The trigger circuit is electrically connected with the frequency-to-voltage converting circuit for comparing the voltage of the voltage signal with that of the reference signal and outputting the control signal with a voltage according to the comparing result. When the voltage signal is smaller than the reference signal, the voltage of the control signal is a low voltage. However, when the voltage signal is larger than the reference signal, the voltage of the control signal is a high voltage.

In accordance with the present invention, the frequency-to-voltage converting circuit further includes a first and a second low-pass filters, and a first and a second comparators. The first low-pass filter is used for filtering out the high-frequency band in the feedback signal to output a first signal. The first comparator electrically connected with the first low-pass filter is used for comparing the first signal with a first reference signal to output a second signal. The second comparator electrically connected with the first comparator is used for comparing the second signal with a second reference signal and reversing the second signal to output a third signal. The second low-pass filter electrically connected with the second comparator is used for filtering out the high-frequency band in the third signal to output the voltage signal.

According to the present invention, the controlling circuit is a current-controlling circuit. It includes a current-limiting device electrically connected with the electrosensitive circuit for limiting the current to be inputted into the electrosensitive circuit and an electronic switch electrically connected with the current-limiting device and the trigger circuit for controlling the current-limiting device to limit the current to be inputted into the electrosensitive circuit in response to the voltage of the control signal. Preferably, the current-limiting device is a resistor, and the electronic switch is a transistor. When the voltage of the control signal is the high voltage, the electronic switch controls the current-limiting device for limiting the current to be inputted into the electrosensitive circuit.

Another object of the present invention is to provide a method for stagedly starting an electrosensitive circuit without introducing a surging current. The method includes (a) providing a feedback signal by the electrosensitive circuit, (b) comparing the feedback signal with a reference signal to generate a control signal, and (c) stagedly increasing a current inputted to the electrosensitive circuit according to the control signal to start the electrosensitive circuit stagedly.

According to the present invention, before the step (b), the method further includes a step of transforming the feedback signal to a voltage signal. The step (c) further includes a step of (c1) increasing the current inputted to the electrosensitive circuit when the voltage of the voltage signal is larger than that of the reference signal.

The present invention may best be understood through the following description with reference to the accompanying drawings, in which:

DETAILED DESCRIPTION OF THE PREFERRED EMBODIMENTS

Figure 1:
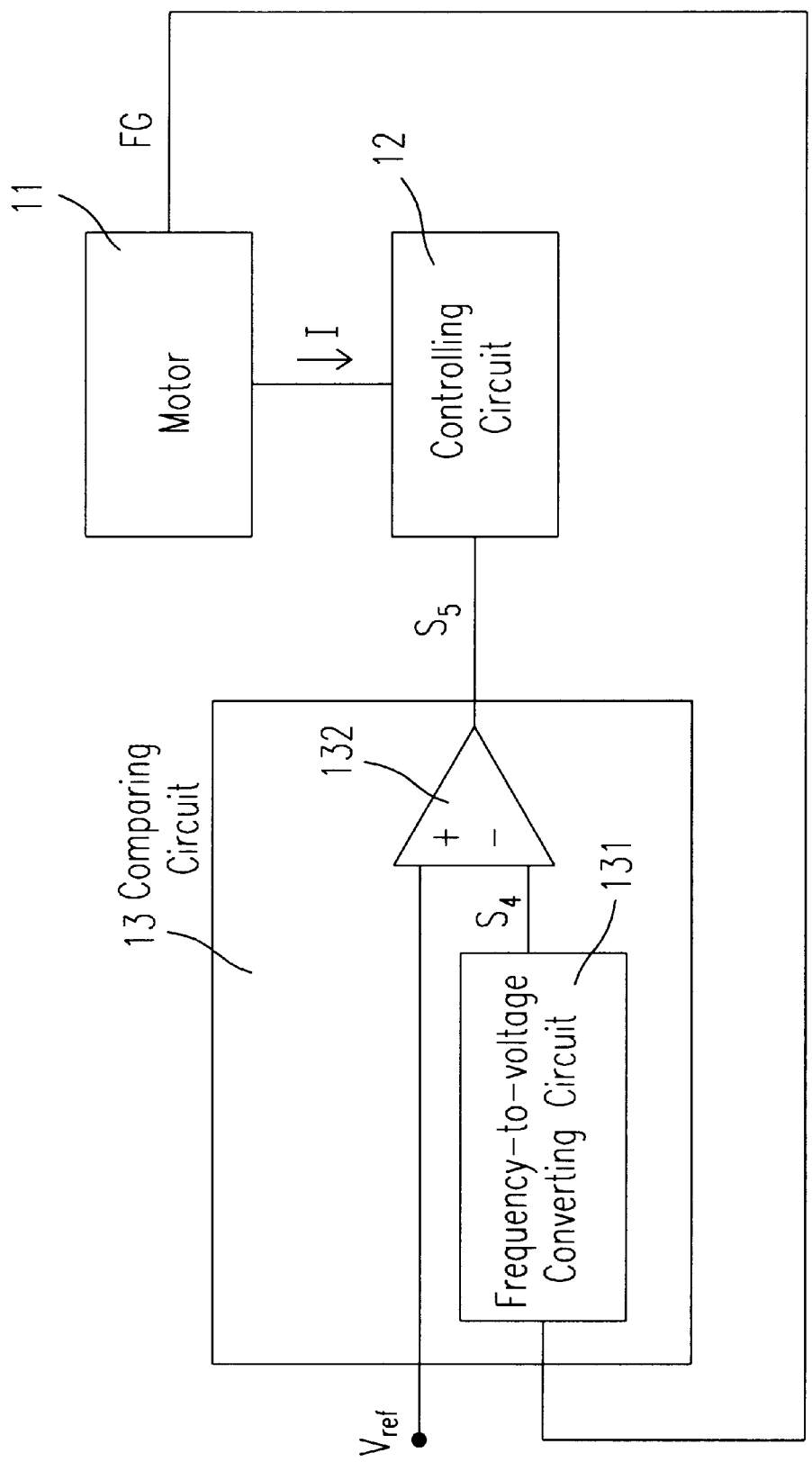
FIG. 1 is a block diagram showing a preferred embodiment of the present invention.

Please refer to FIG. 1. The electrosensitive circuit 11 is preferably a direct-current (DC) motor. When the DC motor 11 is started, a feedback signal FG will be outputted. Then, the feedback signal is received by a comparing circuit 13 to generate a control signal $S_5$. Thereafter, a controlling circuit 12 will control the DC motor 11 to be stagedly started according to the control signal $S_5$. The feedback signal FG is preferably a square-wave signal having a frequency proportional to the rotating speed of the DC motor 11. Because the rotating speed is slow at the moment the DC motor 11 is initially started, the frequency of the feedback signal FG is low. After the DC motor 11 is started for a while, the rotating speed of the DC motor 11 will finally be increased and the frequency of the feedback signal FG will become a high frequency.

The comparing circuit of the present invention further includes a frequency-to-voltage converting circuit 131 and a trigger circuit 132. The frequency-to-voltage converting circuit 131 is used for transforming the feedback signal FG to a voltage signal $S_4$ according to the frequency of the feedback signal FG. The trigger circuit 132 is used for comparing the voltage signal $S_4$ with a reference signal $V_{ref}$ and outputting the control signal $S_5$ with a specific voltage according to the comparing result. The reference signal is inputted by a power supply and the voltage of the reference signal can be preset by the designer or the user. Because the frequency of the feed back signal FG is low at the moment the DC motor 11 is started, the frequency-to-voltage converting circuit 131 will output a low-voltage voltage signal $S_4$. Therefore, the voltage of the voltage signal $S_4$ will be lower than that of a reference signal and the control signal $S_5$ having a high voltage will be outputted from the trigger circuit 132. The controlling circuit 12 includes a current-limiting device for limiting the current to be inputted into the DC motor 11 and a electronic switch for controlling the current-limiting device to limit the current to be inputted into the DC motor in response to the voltage of the control signal $S_5$. The current-limiting device is preferably a resistor and the electronic switch is preferably a transistor. Because the control signal $S_5$ has a high voltage, the controlling circuit 12 will control the DC motor 11 to rotate under a low starting current.

After the DC motor is started for a while, the rotating speed of the DC motor 11 and the frequency of the feedback signal FG are gradually increased. At the same time, the voltage of the voltage signal $S_4$ transformed by the frequency-to voltage circuit 131 is also gradually increased. Until the voltage signal $S_4$ is larger than the reference signal $V_{ref}$, the trigger circuit 132 will change the voltage of the control signal $S_5$ from a high voltage to a low voltage and the low-voltage control signal $S_5$ will cause the DC motor 11 to rotate under a high starting current. In other words, the DC motor 11 is started into a second stage and rotated at a faster speed.

Figure 2:
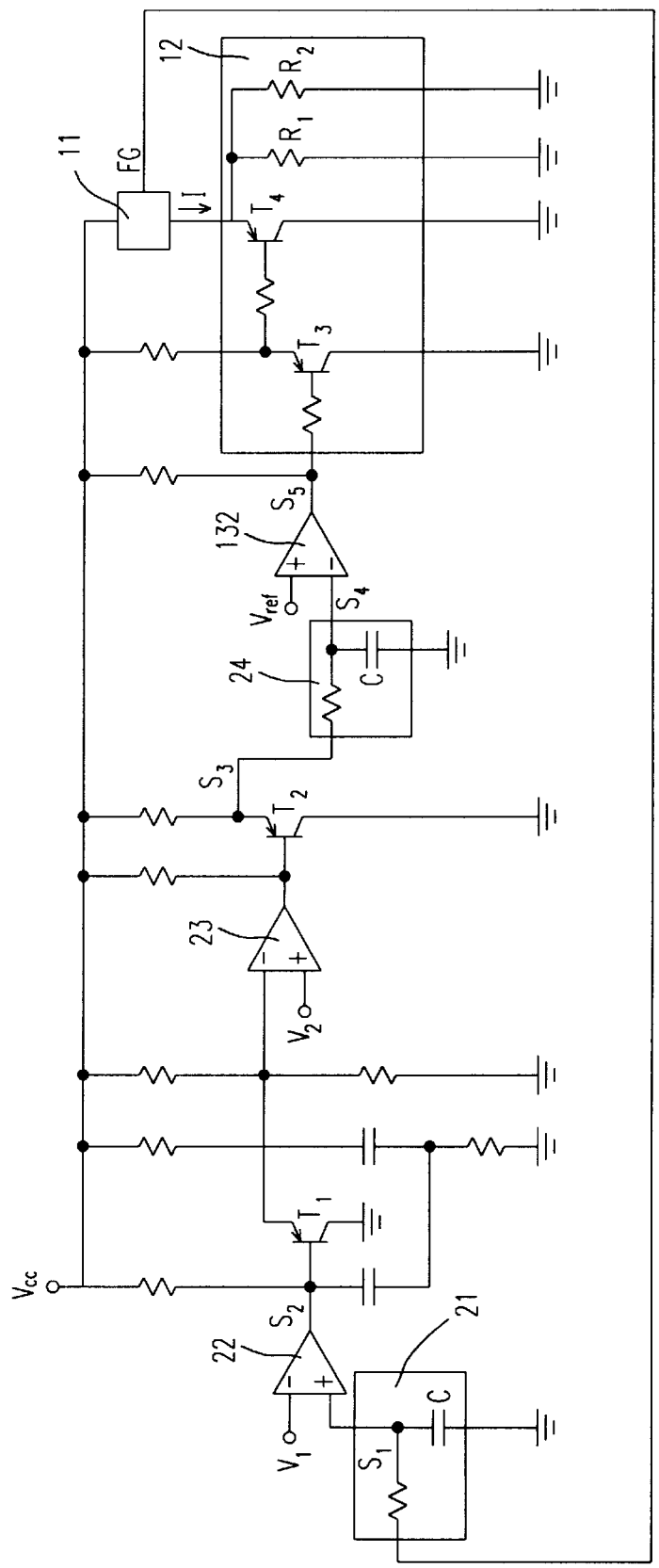
FIG. 2 is a circuit diagram of the embodiment in FIG. 1 according to the present invention.

FIG. 2 is the circuit diagram of embodiment in FIG. 1 according to the present invention. The frequency-to-voltage converting circuit 131 has a first and a second low-pass filters 21, 24, and a first and second comparators 22, 23. The first low-pass filter 21 is used for filtering out the high-frequency band in the feedback signal and outputting a first signal $S_2$. The first comparator 22 is used for comparing the voltage of the first signal $S_2$ with that of a first reference signal $V_1$ and outputting a second signal $S_2$. The second comparator 23 is used for comparing the voltage of the second signal $S_2$ with that of a second reference signal $V_2$ and reversing the second signal to output a third signal $S_3$. The second low-pass filter 24 is used for filtering out the high-frequency band in the third signal $S_3$ and outputting the voltage signal $S_4$.

When the DC motor 11 is initially started, the rotating speed of the DC motor 11 is slow and the frequency of the feedback signal FG is low. Therefore, the capacitor of the first low-pass filter 21 will have sufficient time to be charged and discharged. In other words, the voltage of the first signal $S_1$ will be larger than that of the first reference signal $V_1$, and the second signal $S_2$ outputted by the first comparator 22 becomes a square-wave signal.

Then, the second signal $S_2$ is transferred by the transistor $T_1$ to the negative input port of the second comparator 23. The second comparator 23 is used for comparing the voltage of the second signal $S_2$ with that of the second reference signal $V_2$ and reversing the second signal to output the third signal $S_3$ through the transistor $T_2$. After the second low-pass filter 24 filters out the high-frequency band of the third signal $S_3$, the voltage signal $S_4$ is outputted. At this time, the voltage of the voltage signal $S_4$ is lower than that of the reference signal $V_{ref}$ and the control signal $S_5$ having a high voltage will be outputted from the trigger circuit 132. The high-voltage control signal $S_5$ will drive the transistor $T_3$ to be turned on and control the transistor $T_4$ to be turned off so that the current I can only flow through the resistors $R_1$ and $R_2$ to limit the current I. Therefore, the current inputted into the DC motor 11 will be limited and the DC motor 11 will be started under a small current.

When the rotating speed of the DC motor 11 is increased, the frequency of the feedback signal FG is increased. The capacitor of the first low-pass filter 21 will not have sufficient time to be charged and discharged. The voltage at two ends of the capacitor will not be larger than that of the first reference signal $V_1$, and the second signal $S_2$ outputted by first comparator 22 will have a constant low voltage.

The low voltage of the second signal $S_2$ will drive the transistor $T_1$ to be turned on and the negative input port of the second comparator 23 will have a low voltage. Because this low voltage is smaller than that of the second reference signal $V_2$, the outputting port of the second comparator 23 will have a high voltage. This high voltage will drive the transistor $T_2$ to be turned off and output the third signal $S_3$ having a high voltage.

Because the high-voltage third signal $S_3$ is a direct current, the second low-pass filter 24 will not have any effect on the third signal $S_3$ and the voltage signal $S_4$ still keeps at a high voltage. Because the impedance of the trigger circuit 132 is very large, the voltage drop of the power source $V_{cc}$ is very small. The voltage of the power source $V_{cc}$ is almost equal to that of the voltage signal $S_4$. Therefore, the voltage of the voltage signal $S_4$ is definitely larger than the reference signal $V_{ref}$ and the control signal $S_5$ having a low voltage will be outputted from the trigger circuit 132. The low-voltage control signal $S_5$ is reversed by the transistor $T_3$ to turn on the drain of the transistor $T_4$. The starting current I will be increased from a small current to be a large current and the DC motor 11 is started stagedly.

Figure 3:
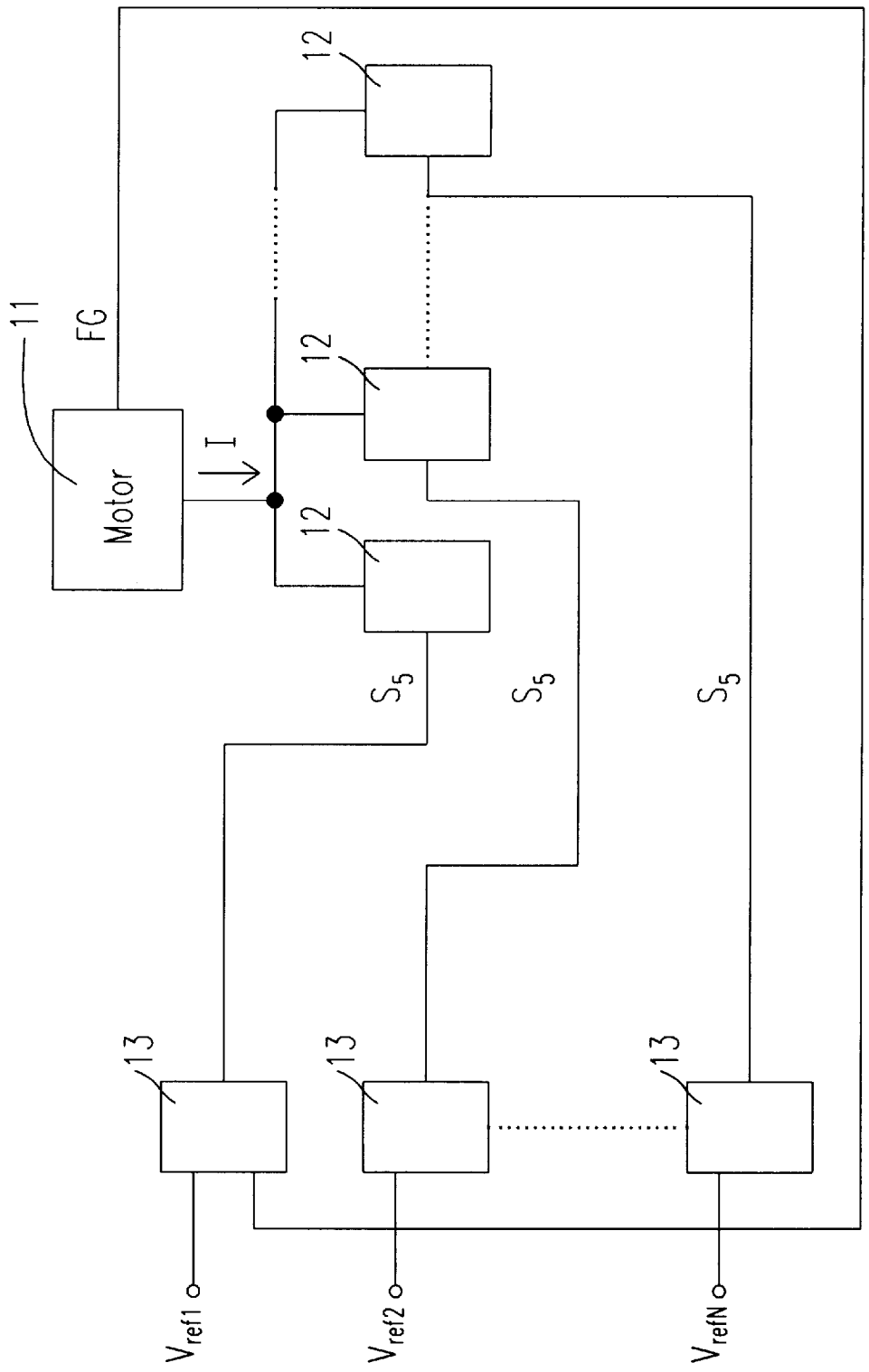
FIG. 3 is a block diagram showing another preferred embodiment of the present invention.
Figure 4:
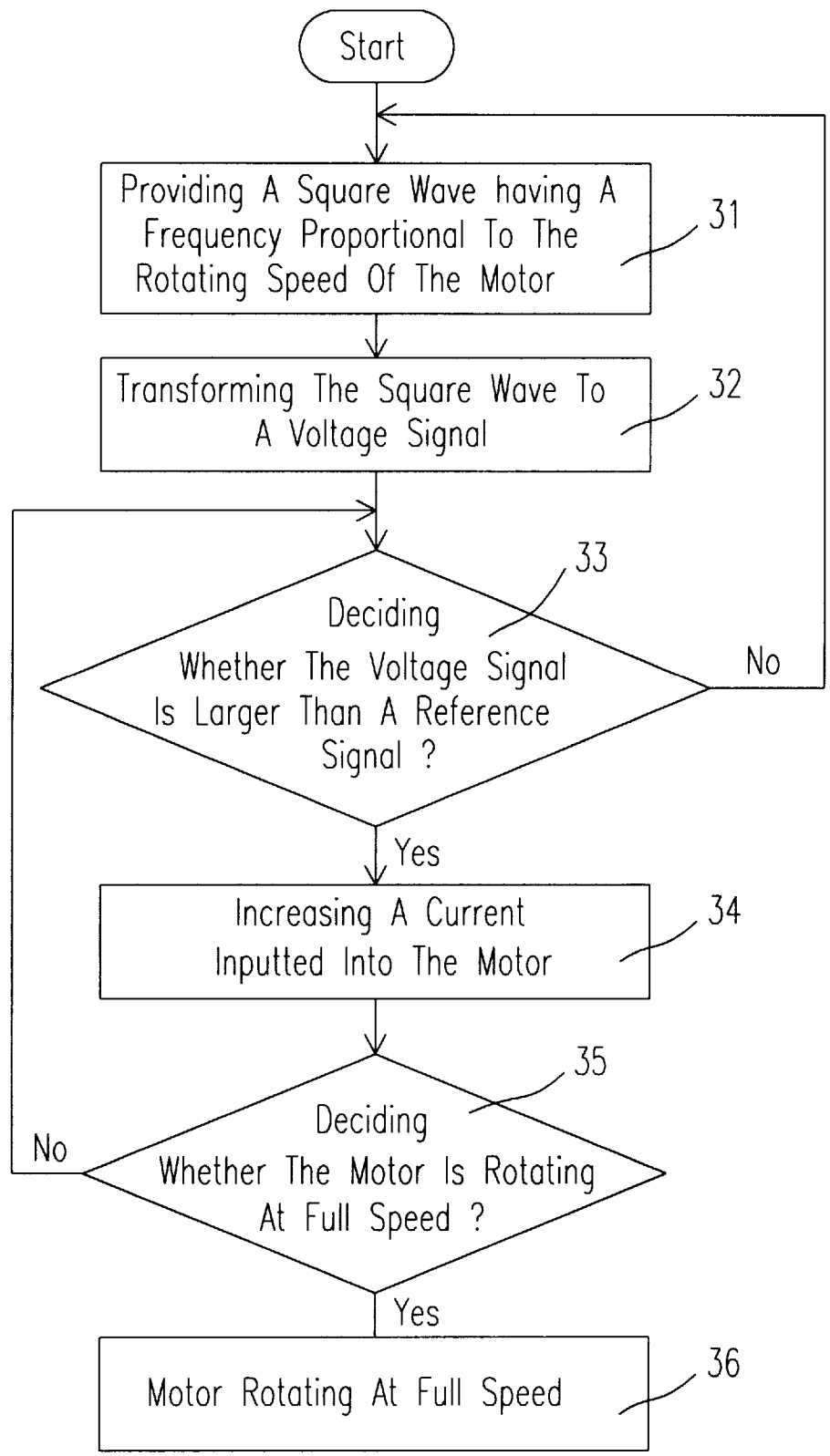
FIG. 4 is a flowchart of the embodiment in FIG. 3 according to the present invention.

Please refer to FIG. 3 showing another preferred embodiment of the present invention. This starting circuit can start the DC motor 11 by two or more stages. The number of the stages depends on the different requirements of the different motors. By connecting multiple starting circuits in series, the DC motor 11 can be started multi-stagedly after the feedback signal is compared with different reference signals $V_{ref1}$, $V_{ref2}$, and $V_{refN}$. The reference signals are inputted by a power supply and the voltages of the reference signals can be preset by the designer or the user. Therefore, the starting circuit can start the DC motor 11 stagedly without introducing a surging current.

The method of the present invention is to use a starting circuit to stagedly start a DC motor without introducing a surging current. The starting circuit can effectively protect the DC motor from the damage of mechanical shock and no noise will be introduced by this method. Fig. is a flowchart showing the controlling procedures of the starting circuit of FIG. 3. The procedures are as follows:

Step 31: When the DC motor is initially started, a square wave having a frequency proportional to the rotating speed of the DC motor is provided. Therefore, the controlling devices can detect the rotating speed of the DC motor.

Step 32: The square wave is transformed to a voltage signal having a voltage propotional to the frequency of the square wave by a frequency-to-voltage converting circuit.

Step 33: When the rotating speed of the DC motor is increased, the voltage of the voltage signal is compared with that of a reference signal.

Step 34: If the rotating speed of the DC motor is faster than a reference speed, a started circuit is triggered to increase the current inputted into the DC motor.

Step 35: The voltage signal is compared with other reference signals and every time the voltage of the voltage signal is larger than that of one of the reference signals, the current inputted into the DC motor is increased until all the starting circuit is started.

Step 36: The DC motor is rotating at full speed.

Of course, the present invention can be used for other electrosensitive circuit to be started without introducing a surging current. The DC motor of the present invention is just an embodiment.

Because starting circuit of the present invention can stagedly start the DC motor, the surging current can be eliminated and no noise will be produced.

While the invention has been described in terms of what are presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A starting circuit for starting an electrosensitive circuit without inducing a surging current, comprising:
    a comparing circuit electrically connected with said electrosensitive circuit, said comparing circuit having a frequency-to-voltage converting circuit for transforming a feedback signal from said electrosensitive circuit to a voltage signal with a voltage associated with a frequency of said feedback signal, and having a trigger circuit for comparing said voltage of said voltage signal with that of a reference signal to generate a control signal with a voltage according to said comparing result;
    a controlling circuit electrically connected with said comparing circuit and said electrosensitive circuit for controlling said electrosensitive circuit to be stagedly started according to said voltage of said control signal without introducing said surging current; and
    wherein said frequency-to-voltage converting circuit includes a first low-pass filter for filtering out a high-frequency band in said feedback signal to output a first signal; a first comparator electrically connected with said first low-pass filter for comparing said first signal with a first reference signal to output a second signal; and a second comparator electrically connected with said first comparator for comparing said second signal with a second reference signal and reversing said second signal to output said voltage signal.

2. The starting circuit according to claim 1, wherein said electrosensitive circuit is a direct-current (DC) motor.

3. The starting circuit according to claim 2, wherein said feedback signal is a periodic signal outputted from said motor.

4. The starting circuit according to claim 3, wherein said periodic signal is a square-wave signal having a frequency proportional to a rotating speed of said DC motor.

5. The starting circuit according to claim 4, wherein when said DC motor is initially started, said rotating speed of said DC motor is a low speed.

6. The starting circuit according to claim 4, wherein after said DC motor is started for a while, said rotating speed of said DC motor is a high speed.

7. The starting circuit according to claim 1, wherein said trigger circuit is a comparator.

8. The starting circuit according to claim 1, wherein when said voltage of said voltage signal is smaller than that of said reference signal, said voltage of said control signal is a high voltage.

9. The starting circuit according to claim 1, wherein when said voltage of said voltage signal is larger than that of said reference signal, said voltage of said control signal is a low voltage.

10. The starting circuit according to claim 1, wherein when said first signal has a voltage larger than that of said first reference signal, said second signal is a periodic signal.

11. The starting circuit according to claim 1, wherein when said first signal has a voltage smaller than that of said first reference signal, said second signal has a constant low voltage.

12. The starting circuit according to claim 1, wherein said controlling circuit is a current-controlling circuit comprising:
    a current-limiting device electrically connected with said electrosensitive circuit for limiting said current to be inputted into said electrosensitive circuit; and
    an electronic switch electrically connected with said current-limiting device and said trigger circuit for controlling said current-limiting device to limit said current to be inputted into said electrosensitive circuit in response to a voltage of said control signal.

13. The starting circuit according to claim 12, wherein said current-limiting device is a resistor.

14. The starting circuit according to claim 12, wherein said electronic switch is said transistor.

15. The starting circuit according to claim 12, wherein when said voltage of said control signal is a high voltage, said electronic switch controls said current-limiting device for limiting said current to be inputted into said electrosensitive circuit.

16. A starting circuit for starting an electrosensitive circuit without introducing a surging current, comprising:
    a comparing circuit electrically connected with said electrosensitive circuit, said comparing circuit having a frequency-to-voltage converting circuit for transforming a feedback signal from said electrosensitive circuit to a voltage signal with a voltage associated with a frequency of said feedback signal, and having a trigger circuit for comparing said voltage of said voltage signal with that of a reference signal to generate a control signal with a voltage according to said comparing result; and
    a controlling circuit electrically connected with said comparing circuit and said electrosensitive circuit for controlling said electrosensitive circuit to be stagedly started according to said voltage of said control signal without introducing said surging current;

wherein said frequency-to-voltage converting circuit includes a first low-pass filter for filtering out a high-frequency band in said feedback signal to output a first signal; a first comparator electrically connected with said first low-pass filter for comparing said first signal with a first reference signal to output a second signal; a second comparator electrically connected with said first comparator for comparing said second signal with a second reference signal and reversing said second signal to output a third signal; and a second low-pass filter electrically connected with said second comparator for filtering out a high-frequency band in said third signal to output said voltage signal.

17. The new starting circuit according to claim 16, wherein said controlling circuit is a current-controlling circuit comprising:

a current-limiting device electrically connected with said electrosensitive circuit for limiting said current to be inputted into said electrosensitive circuit; and an electronic switch electrically connected with said current-limiting device and said trigger circuit for controlling said current-limiting device to limit said current to be inputted into said electrosenstive circuit in response to said voltage of said control signal.

* * * * *

UNITED STATES PATENT AND TRADEMARK OFFICE
CERTIFICATE OF CORRECTION

PATENT NO.  : 6,104,151
DATED       : August 15, 2000
INVENTOR(S) : Tsai

It is certified that error appears in the above-identified patent and that said Letters Patent is hereby corrected as shown below:

Column 1, line 6, "staring" should read --starting--.

Column 6, line 44, "a" should read --said--; line 48, "said" should read --a--.

Signed and Sealed this

Twenty-second Day of May, 2001

Attest:

NICHOLAS P. GODICI

*Attesting Officer*  *Acting Director of the United States Patent and Trademark Office*